US007377874B2

United States Patent
Hayabuchi et al.

(10) Patent No.: US 7,377,874 B2
(45) Date of Patent: May 27, 2008

(54) AUTOMATIC TRANSMISSION

(75) Inventors: Masahiro Hayabuchi, Anjo (JP); Naoji Katou, Anjo (JP); Satoru Kasuya, Anjo (JP); Hiroshi Katou, Anjo (JP); Yasuhiro Asai, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 175 days.

(21) Appl. No.: 11/258,268

(22) Filed: Oct. 26, 2005

(65) Prior Publication Data

US 2006/0122025 A1 Jun. 8, 2006

(30) Foreign Application Priority Data

Dec. 7, 2004 (JP) .............................. 2004/353835

(51) Int. Cl.
*F16H 3/44* (2006.01)
(52) U.S. Cl. ..................................................... 475/289
(58) Field of Classification Search ................. 475/289
See application file for complete search history.

(56) References Cited

U.S. PATENT DOCUMENTS 4,676,123 A * 6/1987 Kubo et al. ................. 475/205

| | | | |
|---|---|---|---|
| 5,106,352 A | 4/1992 | Lepelletier | |
| 5,542,889 A | 8/1996 | Pierce et al. | |
| 6,689,010 B2 * | 2/2004 | Usoro et al. ................. | 475/296 |
| 7,083,537 B2 * | 8/2006 | Knowles et al. ............ | 475/116 |

FOREIGN PATENT DOCUMENTS

JP        A 4-219553        8/1992

* cited by examiner

*Primary Examiner*—Richard W L Ridley
*Assistant Examiner*—Derek D Knight
(74) *Attorney, Agent, or Firm*—Oliff & Berridge, PLC

(57) ABSTRACT

The output rotation of an engine is transmitted to a drive member when a vehicle starts moving, and the drive member is connected to a carrier of a speed-increasing planetary gear via a start clutch. Upon engagement of the start clutch, the rotation of the drive member is accelerated by the speed-increasing planetary gear and then transmitted to an input shaft that is directly connected to a ring gear. Such rotation transmitted to the input shaft is shifted to a plurality of speeds and transmitted to an output shaft by using a plurality of friction engagement elements to selectively connect or fix elements of a single planetary gear set and a multiple planetary gear set that is connected to the output shaft.

9 Claims, 5 Drawing Sheets

FIG. 2

| | C-1 | C-2 | C-3 | B-1 | B-2 | F-1 | GEAR RATIO |
|---|---|---|---|---|---|---|---|
| P | | | | | | | – |
| REV | | | ○ | | ○ | | 3.389 |
| N | | | | | | | – |
| 1ST | ○ | | | | (○) | ○ | 4.067 |
| 2ND | ○ | | | ○ | | | 2.354 |
| 3RD | ○ | | ○ | | | | 1.564 |
| 4TH | ○ | ○ | | | | | 1.161 |
| 5TH | | ○ | ○ | | | | 0.857 |
| 6TH | | ○ | | ○ | | | 0.684 |

AUTOMATIC TRANSMISSION

INCORPORATION BY REFERENCE

The disclosure of Japanese Patent Application No. 2004-353835, filed on Dec. 7, 2004, including the specification, drawings and abstract is incorporated herein by reference in its entirety.

BACKGROUND

The disclosure relates to an automatic transmission in which elements of a single planetary gear set connected to an input shaft are connectable with elements of a multiple planetary gear set via a clutch, in addition to being fixable via a brake, such that the rotation of the input shaft is shifted to multiple speeds and then transmitted to an output shaft.

An automatic transmission, disclosed in Japanese Patent Laid-Open Publication No. 4-219553 (paragraphs 0030 and 0034, and FIG. 3) (U.S. Pat. No. 5,106,352 is of the family of the Japanese Publication), is provided with a single planetary gear set and a multiple planetary gear set. The single planetary gear set has a first ring gear, a first sun gear fixed to a transmission case, and a first carrier supporting a pinion that meshes with the first sun gear and the first ring gear. Meanwhile, the multiple planetary gear set is provided with second and third sun gears, a long pinion, an intermediate pinion, a common carrier, and a common ring gear. The long pinion directly meshes with the second sun gear, and meshes with the third sun gear via the intermediate pinion. The common carrier supports the long pinion and the intermediate pinion, while the common ring gear meshes with the long pinion. In order to establish shift speeds including six forward speeds and one reverse speed, the common ring gear of the multiple planetary gear set is directly connected to an output shaft, and the rotation of the first carrier of the single planetary gear set (whose rotational speed is decelerated by the rotation of the input shaft) is selectively transmitted to the third and second sun gears of the multiple planetary gear set via first and third clutches. Additionally, the rotation of the input shaft is selectively transmitted to the multiple planetary gear set via a second clutch. The second sun gear and the common carrier of the multiple planetary gear set are selectively fixed by first and second brakes, respectively.

Disclosed in U.S. Pat. No. 5,542,889 (third and fourth columns, and FIG. 1) is an automatic transmission (see FIG. 1 of the U.S. patent) that has a single planetary gear set 52 structured such that a crankshaft 14 of an engine is directly connected to an impeller 12 of a torque converter 10, and a turbine 16 is directly connected to an input shaft 44. Moreover, a ring gear 72 rotates and accelerates the rotational speed of a carrier 74 directly connected to the input shaft 44, a fixed sun gear 70, and the input shaft 44. The automatic transmission also has multiple planetary gear sets 50, 48 structured such that a ring gear 64 and a carrier 58 of the two planetary gear sets 50, 48 are directly connected, and a carrier 66 and a ring gear 56 are connectable by a clutch CL1. The sun gear 62 of the multiple planetary gear sets 50, 48 is connectable with a carrier 74 via a clutch CL3, and fixable using a brake B2. Reverse rotation of the carrier 66 is prevented by a one-way clutch 82. Likewise, reverse rotation of the ring gear 56, which is connected to the carrier 66 via the clutch CL1, is also prevented by the one-way clutch 82. The carrier 66 is connectable with the ring gear 72 of the planetary gear set 52 via a clutch CL2, and fixable using a brake B1. Furthermore, the directly connected ring gear 64 and carrier 58 are also directly connected to an output shaft 90, and a sun gear 54 of the planetary gear set 48 is directly connected to the input shaft 44.

According to the automatic transmission described in Japanese Patent Laid-Open Publication No. 4-219553, the output rotation of the engine is decelerated by the single planetary gear set, and then input to the multiple planetary gear set, whereby torque increased by the multiple planetary gear set is transmitted. Furthermore, if the engine output characteristic outputs a high torque at a relatively low output rotation, for example, as in the case of a diesel engine, the transmitted torque further increases. Thus, an accompanying increase in the sizes of parts, and an increase in the capacities of clutches and brakes are required in order to handle the higher torque.

The automatic transmission described in U.S. Pat. No. 5,542,889 attempts to resolve such a problem, wherein rotation of the input shaft rotationally driven by the engine via a torque converter is first accelerated by the single planetary gear set 52 and then input to the multiple planetary gear sets 48, 50. A vehicle with high output torque at a low-speed rotation, such as one mounted with a diesel engine, starts moving by switching from the torque converter and gradually connecting a start clutch. However, the automatic transmission described in U.S. Pat. No. 5,542,889 is rotationally driven via the torque converter and thus cannot avoid a reduction in transmission efficiency due to transmission loss caused by the fluid. Furthermore, to ensure compatibility with variations of gasoline engines with high rotational speed and diesel engines with relatively low rotational speed requires changing the single planetary gear set inside the automatic transmission. This in turn requires many part changes, resulting in increased costs. As used herein "rotation" is representative of rotational speed and/or rotational torque.

SUMMARY

The invention was devised to resolve problems found in the related art, and it is an object to provide an automatic transmission capable of reducing the sizes of parts and the capacities of friction engagement elements through deceleration of the sharing torque of the automatic transmission parts. This is achieved by transmitting the output rotation of an engine to a speed-increasing planetary gear via a start clutch, which then accelerates and transmits such rotation to an input shaft. The rotation of the input shaft is then shifted by the single planetary gear set and the multiple planetary gear set.

According to a first aspect, the output rotation of an engine is transmitted to a drive member when a vehicle starts moving, and the drive member is gradually connected to a carrier of a speed-increasing planetary gear via a start clutch. Upon engagement of the start clutch, the rotation of the drive member is accelerated by the speed-increasing planetary gear, and then transmitted to an input shaft that is directly connected to a ring gear. Such rotation transmitted to the input shaft is shifted to a plurality of speeds and transmitted to an output shaft by using a plurality of friction engagement elements to selectively connect or fix elements of a single planetary gear set and a multiple planetary gear set that is connected to the output shaft.

Thus, the rotation of the drive member is accelerated by the speed-increasing planetary gear, and then input to single and multiple planetary gear sets. It is therefore possible to decrease the input torque, as well as reduce the sizes of parts and the capacities of clutches and brakes. Furthermore, the following measures have made it possible to provide an automatic transmission suitable for a diesel engine, for example, with a lower rotational speed and higher torque than a gasoline engine, but without increasing the sizes of parts or the capacities of the clutches and brakes: commonizing a major portion of an automatic transmission for a conventional gasoline engine designed such that the rotation of the input shaft connected to the rotation of the gasoline engine is decelerated by the single planetary gear set and then input to the multiple planetary gear set; and making a drive member to which the output rotation of the engine is transmitted connectable with the ring gear of the speed-increasing planetary gear using the start clutch in place of a torque converter.

Furthermore, a hydraulic servo portion of the start clutch is provided in the drive member rearward of the speed-increasing planetary gear. Therefore, a hydraulic oil passage for supplying and draining hydraulic oil to and from the hydraulic servo portion, as well as a lubrication oil passage for supplying lubrication oil to the speed-increasing planetary gear, can both be easily formed.

For variations of gasoline engines with high rotational speed and diesel engines with relatively low rotational speed and high torque, the assembly of the start clutch and the speed-increasing planetary gear may be changed, for example, to a start clutch apparatus without a speed-increasing planetary gear, or to a torque converter or the like. Thus, commonization of the automatic transmission body for use with gasoline engines and diesel engines can be achieved, and cost increases can be kept to a minimum even with increased variations.

According to a second aspect, the transmission case is provided with a rear case portion, a front case portion, and an intermediate wall portion. The rear case portion accommodates the single planetary gear set, the multiple planetary gear set and a plurality of friction engagement elements, while the front case portion accommodates the speed-increasing planetary gear and the start clutch. A support member that supports the input shaft is provided protruding from the intermediate wall portion. Between the intermediate wall portion and the speed-increasing planetary gear, a rear wall of the drive member is rotatably and supported by the intermediate wall portion. In addition, a cylinder of the hydraulic servo portion of the start clutch is formed on the rear wall, and a hydraulic oil passage that communicates with the cylinder is formed in the intermediate wall portion. A lubrication oil hole is also provided in the input shaft for supplying lubrication oil to portions of the speed-increasing planetary gear and a centrifugal hydraulic canceller of the hydraulic servo portion.

Thus, in addition to achieving an effect identical to the first aspect, the hydraulic oil passage for supplying and draining hydraulic to and from the hydraulic servo portion of the start clutch can be easily formed in the intermediate wall portion. Moreover, the lubrication oil passage for supplying lubrication oil to portions of the speed-increasing planetary gear and the centrifugal hydraulic canceller of the hydraulic servo portion can be easily formed in the input shaft, while also ensuring its separation from the hydraulic oil passage.

According to a third aspect, the leakage of hydraulic oil is prevented using a simple structure, and therefore the controllability of the start clutch is increased.

According to a fourth aspect, a communication oil passage is provided between the hydraulic oil passage and a connecting member. Therefore, it is possible to supply lubrication oil to a cancel oil chamber without employing a complicated oil passage structure, such as one passing through a spline connection portion or the like. Consequently, the passage resistance of the communication oil passage is decreased, and lubrication oil can be delivered to the cancel oil chamber without fail. Therefore, it is possible to ensure cancellation of centrifugal hydraulic pressure acting on the hydraulic servo portion, whereby controllability of the start clutch is increased.

According to a fifth aspect, lubrication oil is supplied both forward and rearward of the connecting member. Therefore, it is possible to ensure the lubrication of parts requiring lubrication, such as thrust bearings, provided in front of and behind the connecting member.

According to a sixth aspect, the speed-increasing planetary gear is structured as a single pinion planetary gear. The single pinion planetary gear set is structured with a first ring gear directly connected to the input shaft; a first sun gear fixed to the transmission case; and a carrier supporting a first pinion that meshes with the first ring gear and the first sun gear. The multiple planetary gear set is structured with second and third sun gears; a long pinion that directly connects to the second sun gear and meshes with the third sun gear via an intermediate pinion; a common carrier that supports the long pinion and the intermediate pinion; and a common ring gear that meshes with the long pinion. The output rotation of the engine is transmitted to the drive member when the vehicle starts moving, and the drive member is gradually connected to the carrier of the speed-increasing planetary gear via the start clutch. Upon engagement of the start clutch, the second sun gear is selectively connected to a first carrier via a third clutch, or selectively fixed via a first brake. The common carrier is selectively connected to the input shaft via a second clutch, or selectively fixed via a second brake. The common ring gear is directly connected to the output shaft. The third sun gear is selectively connected to the first carrier via a first clutch.

Thus, in addition to achieving an effect identical to the first aspect, it is possible to shift the rotation of the drive member to six forward speeds and one reverse speed set suitably apart, and then output such rotation to the output shaft using a compact structure with a short overall length.

BRIEF DESCRIPTION OF THE DRAWINGS

The disclosure will be made with reference to the drawings, in which:

FIG. 2 is a drawing showing engagement states and gear ratios of brakes and clutches at each shift speed of the embodiment;

DETAILED DESCRIPTION OF THE PREFERRED EMBODIMENTS

Figure 1:
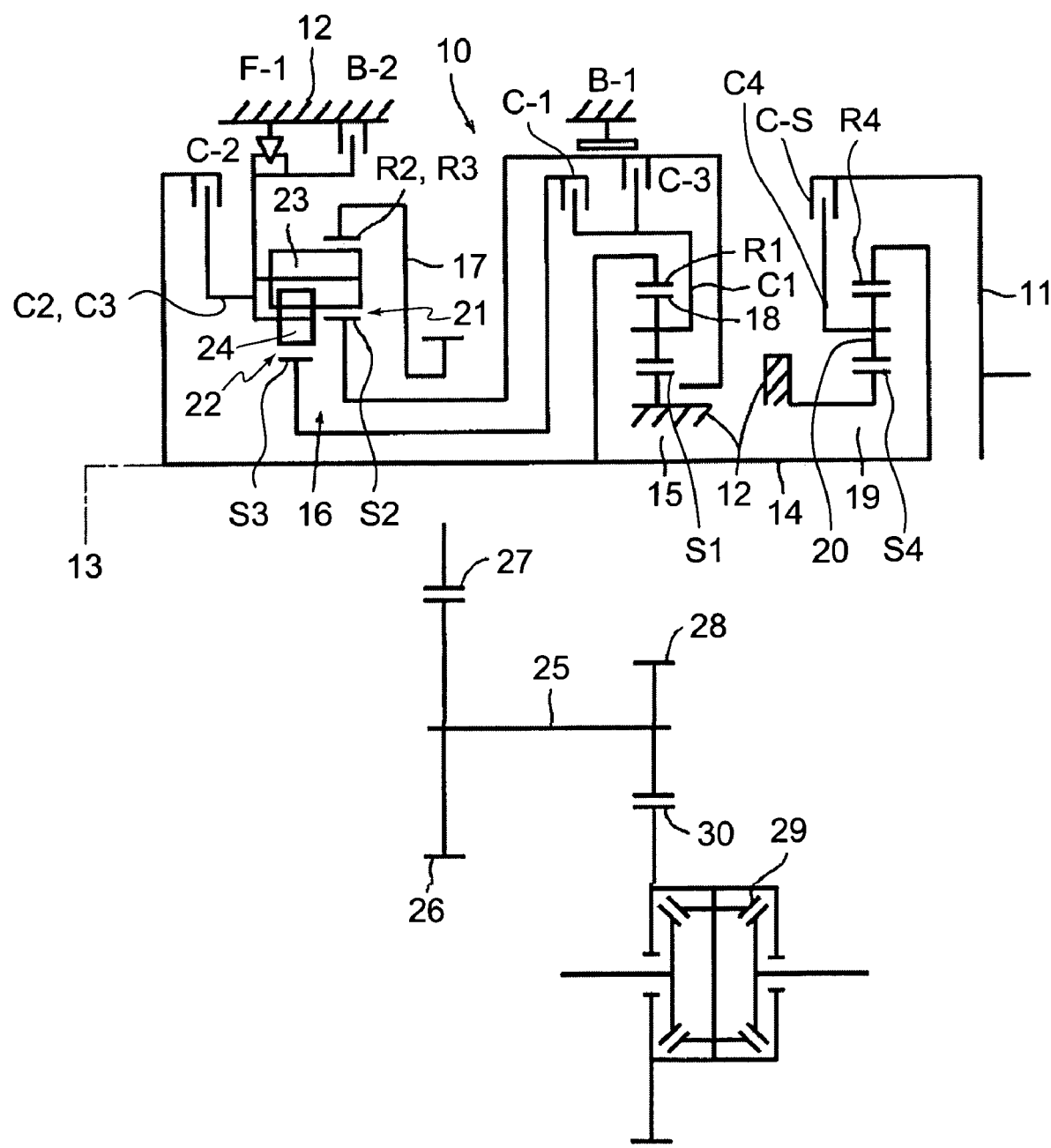
FIG. 1 is a schematic drawing showing an exemplary embodiment of an automatic transmission.

Hereinafter, an exemplary embodiment of an automatic transmission will be described based upon the accompanying drawings. In FIG. 1, reference numeral 10 denotes an automatic transmission that is used, for example, to shift the rotation of a drive member 11 that is driven by the output rotation of a diesel engine in a vehicle, and then transmit such rotation to a drive wheel. The automatic transmission 10 is structured with the following, all of which are supported, in the order below, on a common axis 13 in a transmission case 12 attached to a vehicle body (toward the engine is a front side of the transmission case 12): the drive member 11, a speed-increasing planetary gear 19, a single planetary gear set 15, a multiple planetary gear set 16, an output shaft 17, a start clutch C-S, clutches C-1 to C-3, and brakes B-1, B-2.

Additionally, the speed-increasing planetary gear 19 is structured with a sun gear S4, a carrier C4, and a ring gear R4. The sun gear S4 is fixed to the transmission case 12. However, the carrier C4 is connectable with the drive member 11 via the start clutch C-S, and supports a pinion 20 that meshes with the sun gear S4. The ring gear R4 meshes with the pinion 20 and is directly connected to an input shaft 14.

The single planetary gear set 15 is structured with a first sun gear S1, a first carrier C1, and a first ring gear R1. The first sun gear S1 is fixed to the transmission case 12, whereas the first carrier C1 supports a pinion 18 that meshes with the first sun gear S1. The first ring gear R1 meshes with the pinion 18 and is directly connected to the input shaft 14.

Meanwhile, the multiple planetary gear set 16 is structured with second and third sun gears S2, S3, a long pinion 23, common carriers C2, C3, and common ring gears R2, R3. The second and third sun gears S2, S3 are rotatably supported on the common axis 13. The long pinion 23 directly meshes with the second sun gear S2, and meshes with the third sun gear S3 via an intermediate pinion 24. In addition, the common carriers C2, C3 support the long pinion 23 and the intermediate pinion 24. The common ring gears R2, R3 mesh with the long pinion 23.

Furthermore, the second sun gear S2 of the multiple planetary gear set 16 is connectable with the first carrier C1 of the single planetary gear set 15 via the third clutch C-3, and also fixable to the case 12 via the first brake B-1. The common carriers C2, C3 are connectable with the input shaft 14 via the second clutch C-2, and also fixable to the transmission case 12 via the second brake B-2. In addition, the common carriers C2, C3 are connected to the transmission case 12 via a one-way clutch F-1 that is disposed parallel with the second brake B-2 so as to prevent the reverse rotation of the common carriers C2, C3. The common ring gears R2, R3 are directly connected to the output shaft 17. Also, the third sun gear S3 is connectable with the first carrier C1 via the first clutch C-1.

On the transmission case 12, a countershaft 25, that is parallel to the common axis 13, is pivotally supported in a rotatable state. A driven gear 26 fixed to the countershaft 25 meshes with a drive gear 27 formed on the output shaft 17. Also fixed to the countershaft 25 is a differential drive pinion 28 with a diameter smaller than the driven gear 26. The differential drive pinion 28 meshes with a differential ring gear 30 of a differential 29 that transmits the rotation of the output shaft 17 to right and left front wheels of the vehicle.

In the automatic transmission 10, structured as described above, the start clutch C-S is gradually engaged when the vehicle starts moving, and the drive member 11, to which the output rotation of the engine is transmitted, and the carrier C4 of the speed-increasing planetary gear 19 are connected. Accordingly, the input shaft 14 directly connected to the ring gear R4 rotates at an increased speed over the rotation of the drive member 11. Thereafter, shift speeds, including six forward speeds and one reverse speed, are achieved by selectively engaging the first to third clutches C1 to C3 and the first and second brakes B-1, B-2, and also by selectively engaging or fixing the elements of the single planetary gear set 15 and the multiple planetary gear set 16, the input shaft 14, and the output shaft 17. In an engagement chart shown in FIG. 2, circles in clutch and brake columns indicate a connected state in the case of a clutch, and a fixed state in the case of a brake, for the corresponding shift speed.

The start clutch C-S, the first to third clutches C-1 to C-3, and the first and second brakes B-1, B-2 all function as friction engagement elements that detachably connect two members. Each friction engagement element is structured with a friction engagement portion and a hydraulic servo portion. In the friction engagement portion, a plurality of friction plates is alternately disposed. The plurality of friction plates regulate the respective and relative rotation of two detachably connected members, and are in spline engagement with respective ones of the detachably connected members and relatively movable in the axial direction. In the hydraulic servo portion, a piston, slidably fitted in a cylinder, is biased and moved forward against the spring force of a compression spring due to hydraulic oil, and presses against a friction plate such that the two members connect. The two members become disconnected upon recession of the piston in accordance with the spring force of the compression spring.

With regard to a single pinion planetary gear 21 in the single planetary gear set 15 and the multiple planetary gear set 16, Equation (1) indicates the relationship among a rotational speed Ns of the sun gear, a rotational speed Nc of the carrier, a rotational speed Nr of the ring gear and a gear ratio $\lambda$ of the single pinion planetary gear. Meanwhile, with regard to a double pinion planetary gear 22 of the multiple planetary gear 16, Equation (2) indicates the relationship among the rotational speed Ns of the sun gears, the rotational speed Nc of the carriers, the rotational speed Nr of the ring gears, and the gear ratio $\lambda$ of the double pinion planetary gear. The gear ratio for each shift speed is calculated based upon the Equations (1), (2). The gear ratios for the single planetary gear set 15, the single pinion planetary gear 21 and the double pinion planetary gear 22 are $\lambda 1 = Zs1/Zr1$, $\lambda 2 = Zs2/Zr23$, $\lambda 3 = Zs3/Zr23$, where Zs1, Zs2, Zs3 are the number of teeth in the first to third sun gears S1, S2, S3; and Zr1, Zr23 are the number of teeth of the first ring gear R1 and common ring gears R2, R3.

$$Nr = (1+\lambda)Nc - \lambda Ns \qquad (1)$$

$$Nr = (1-\lambda)Nc + \lambda Ns \qquad (2)$$

Figure 3:
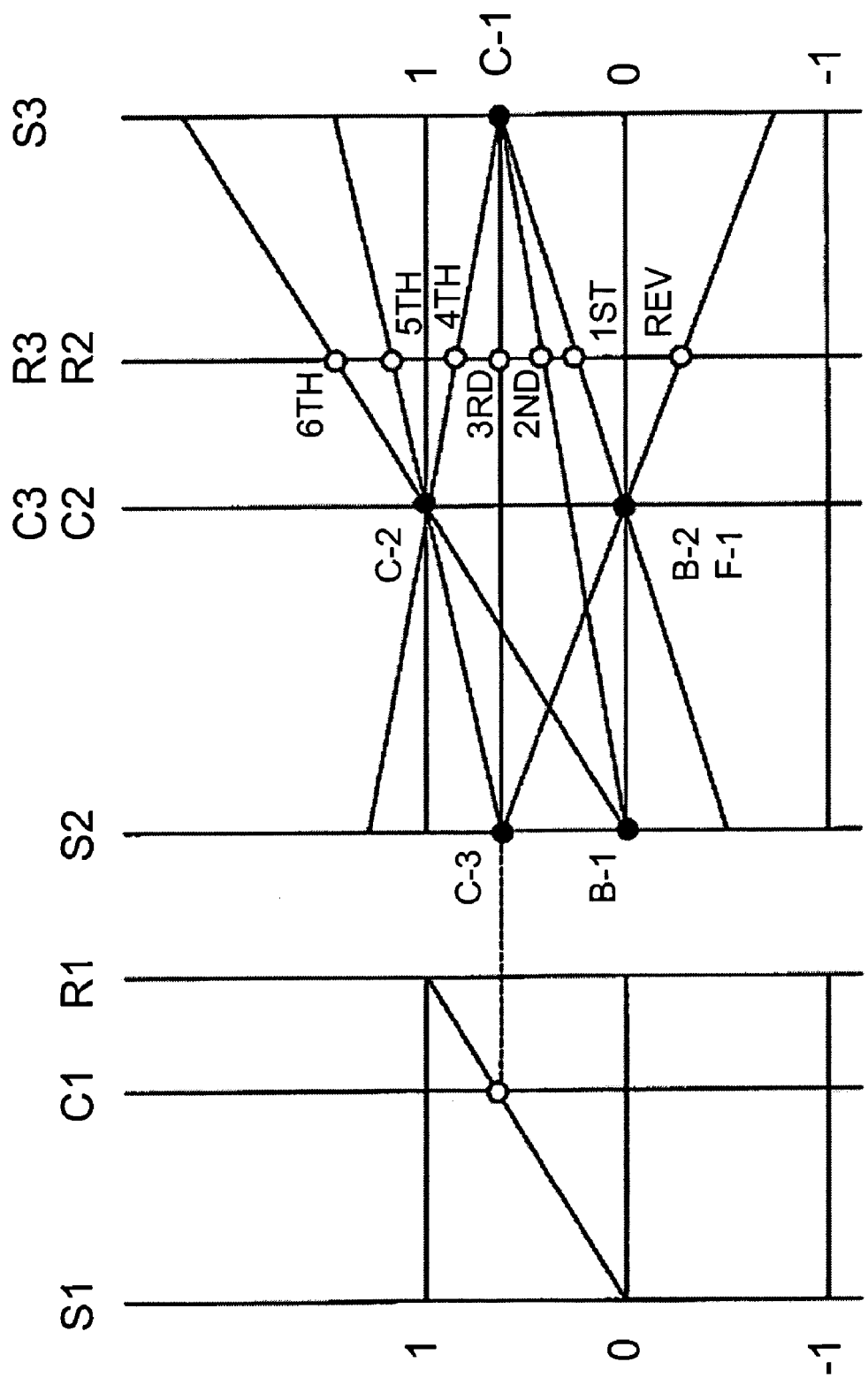
FIG. 3 is a velocity diagram showing rotation ratios of each element in a planetary gear set at each shift speed of the embodiment.

FIG. 3 shows velocity diagrams of the speed ratios of each element in the single planetary gear set 15 and the multiple planetary gear set 16 when the first to third clutches C-1 to C-3 are selectively engaged, as well as when the first and second brakes B-1, B-2 are selectively engaged. In the velocity diagrams, each element of the planetary gears comprising the sun gears, carriers, and ring gears are arranged at intervals in the horizontal axis direction that correspond to the gear ratios, and the speed ratios corresponding to each element are indicated in the vertical axis direction. The velocity diagrams of the single planetary gear set 15 and the multiple planetary gear set 16 are shown side by side in FIG. 3.

In the multiple planetary gear set 16, the carriers C2, C3, as well as the ring gears R2, R3 of the single pinion planetary gear 21 and the double pinion planetary gear 22 are used in common, respectively. Therefore, the speed ratios of the common carriers C2, C3 and the common ring gears R2, R3 are each represented on vertical lines that denote C2, C3 and R2, R3, respectively. With regard to the single planetary gear set 15, an interval between the vertical line of the first carrier C1 and the vertical line of the sun gear S1 is considered 1, and the vertical line of the ring gear R1 is arranged on the side opposite the vertical line of the sun gear S1 at an interval λ1 from the vertical line of the first carrier C1. For the single pinion planetary gear 21, an interval between the vertical line of the common carriers C2, C3 and the vertical line of the sun gear S2 is considered 1, and the vertical line of the common ring gears R2, R3 is arranged on the side opposite the vertical line of the sun gear S2 at an interval λ2 from the vertical line of the common carriers C2, C3. For the double pinion planetary gear 22, an interval between the vertical line of the common carriers C2, C3 and the vertical line of the sun gear S3 is considered 1, and the vertical line of the common ring gears R2, R3 is arranged on the same side as the vertical line of the sun gear S3 at a gear ratio λ3 from the vertical line of the common carriers C2, C3. Points in the velocity diagrams where the first to third clutches C-1 to C-3 and the first and second brakes B-1, B-2 are selectively operated are noted as C-1 to C-3 and B-1, B-2.

In the velocity diagram of the multiple planetary gear set 16 created as described above, elements corresponding to the four vertical lines are designated from left to right as first, second, third, and fourth elements. In the case of the multiple planetary gear set 16 of the embodiment, the second sun gear S2 is the first element, the common carriers C2, C3 are the second element, the common ring gears R2, R3 are the third element, and the third sun gear S3 is the fourth element.

Figure 4:
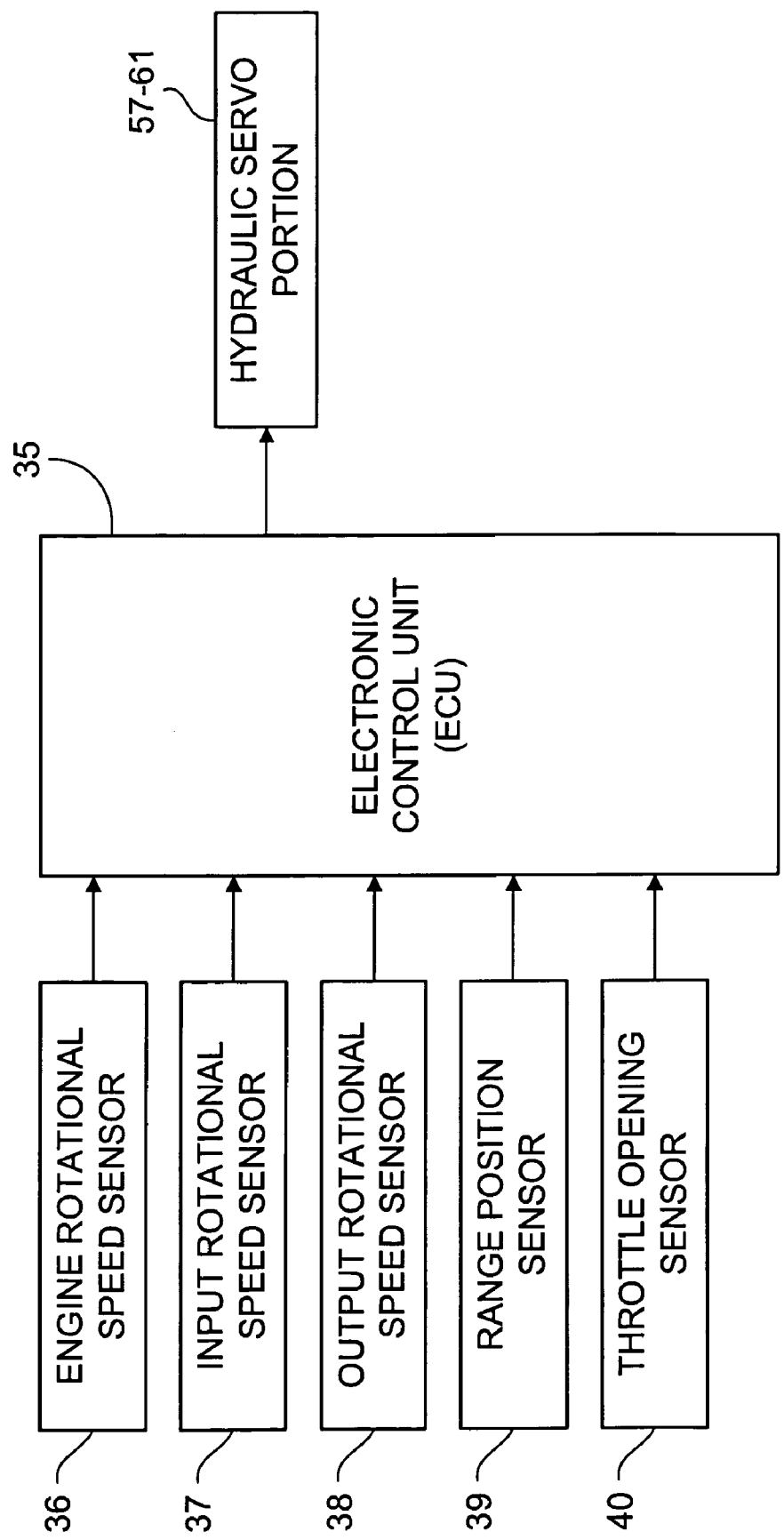
FIG. 4 is a block diagram showing a control apparatus.

A control apparatus of the automatic transmission 10 will now be described based upon a block diagram shown in FIG. 4. A control unit 35 with a built-in CPU is input with detection signals, including those from an engine rotational speed sensor 36 that detects an engine rotational speed Ne; an input rotational speed sensor 37 that detects a rotational speed Ni of the input shaft 14; an output rotational speed sensor 38 that detects a rotational speed Nv of the output shaft 17; a range position sensor 39 that outputs detection signals D, N, or R when a shift lever is shifted to a drive range D, a neutral range N, or a reverse range R; and a throttle opening sensor 40 that detects a pressed amount Ss of an accelerator pedal. Based upon these detection signals, an optimum shift speed is selected and a control current is output to the hydraulic servo portions operating the first to third clutches C-1 to C-3 and the first and second brakes B-1, B-2. The first to third clutches C-1 to C-3 and the first and second brakes B-1, B-2 are then selectively engaged and disengaged, as shown in FIG. 2, to achieve six forward speeds and one reverse speed. When the vehicle starts moving, the control unit 35 outputs a gradually decreasing control current to a hydraulic servo portion 47 to gradually engage the start clutch C-S.

A first speed (1st) is achieved by engagement of the first clutch C-1 by the control unit 35 and automatic engagement of the one-way clutch F-1. The rotation of the first carrier C1 of the single planetary gear set 15, which decelerated the rotation of the input shaft 14, is input to the third sun gear S3 of the multiple planetary gear set 16 via the first clutch C-1. In addition, a reaction force is applied to the common carriers C2, C3 by the one-way clutch F-1 to prevent reverse rotation of the common carriers C2, C3. Therefore, the common ring gears R2, R3 are decelerated to the first speed gear ratio and positively rotated.

In cases where the engine brake is applied on a downhill road, the rotation of the common ring gears R2, R3, which are rotated by the drive wheel, becomes greater than the rotational speed transmitted to the second sun gear S2 from the engine side. Consequently, the direction of reaction force acting on the common carriers C2, C3 becomes reversed. Therefore, when the engine brake is applied, the common carriers C2, C3 are fixed through engagement of the second brake B-2 as shown by a circle in parenthesis in FIG. 2.

A second speed (2nd) is achieved by engagement of the first clutch C-1 and the first brake B-1. The rotation of the first carrier C1, which decelerated the rotation of the input shaft 14, is input to the third sun gear S3 of the multiple planetary gear set 16 via the first clutch C-1. In addition, the second sun gear S2 is fixed by the first brake B-1. Therefore, the common ring gears R2, R3 are decelerated to the second speed gear ratio and positively rotated.

A third speed (3rd) is achieved by engagement of the first and third clutches C-1, C-3. The rotation of the first carrier C1, which decelerated the rotation of the input shaft 14, is input to the third and second sun gears S3, S2 of the multiple planetary gear set 16 via the first and third clutches C-1, C-3, whereby the multiple planetary gear set 16 is integrally rotated. Therefore, the common ring gears R2, R3 are positively rotated at the third speed gear ratio at the same rotational speed as the first carrier C1.

A fourth speed (4th) is achieved by engagement of the first and second clutches C-1, C-2. The rotation of the first carrier C1, which decelerated the rotation of the input shaft 14, is input to the third sun gear S3 of the multiple planetary gear set 16 via the first clutch C-1. In addition, the rotation of the input shaft 14 is input to the common carriers C2, C3 via the second clutch C-2. Therefore, the common ring gears R2, R3 are decelerated to the fourth speed gear ratio and positively rotated.

A fifth speed (5th) is achieved by engagement of the second and third clutches C-2, C-3. The rotation of the first carrier C1, which decelerated the rotation of the input shaft 14, is input to the second sun gear S2 of the multiple planetary gear set 16 via the third clutch C-3. In addition, the rotation of the input shaft 14 is input to the common carriers C2, C3 via the second clutch C-2. Therefore, the common ring gears R2, R3 are accelerated to the fifth speed gear ratio and positively rotated.

A sixth speed (6th) is achieved by engagement of the second clutch C-2 and the first brake B-1. The rotation of the input shaft 14 is input to the carriers C2, C3 of the multiple planetary gear set 16 via the second clutch C-2. In addition, the second sun gear S2 is fixed via the first brake B-1. Therefore, the common ring gears R2, R3 are accelerated to the sixth speed gear ratio and positively rotated.

A reverse speed (REV) is achieved by engagement of the third clutch C-3 and the second brake B-2. The rotation of the first carrier C1, which decelerated the rotation of the input shaft 14, is input to the second sun gear S2 of the multiple planetary gear set 16 via the third clutch C-3. In addition, the common carriers C2, C3 are fixed via the second brake B-2. Therefore, the common ring gears R2, R3 are decelerated to the reverse speed gear ratio and negatively rotated.

The gear ratios λ1, λ2, λ3, and λ4 (number of sun gear teeth/number of ring gear teeth) of the single planetary gear set 15, the single pinion planetary gear 21, the double pinion planetary gear 22, and the speed-increasing planetary gear 19 are respectively set, for example, to 0.556, 0.458, 0.375, and 0.639. If the gear ratios for each shift speed are calculated based upon Equations (1), (2), the rotation ratios, i.e., the gear ratios, of the drive member 11 (the carrier C4) and the output shaft 17 (the common ring gears R2, R3) are 4.067 in first speed, 2.354 in second speed, 1.564 in third speed, 1.161 in fourth speed, 0.857 in fifth speed, 0.684 in sixth speed, and 3.389 in reverse speed, as shown in FIG. 2, such that the gear ratios decrease at an appropriate proportion for each shift speed. Therefore, according to the automatic transmission of the embodiment, it is possible to obtain gear ratios for six forward speeds and one reverse speed that are set suitably apart.

Figure 5:
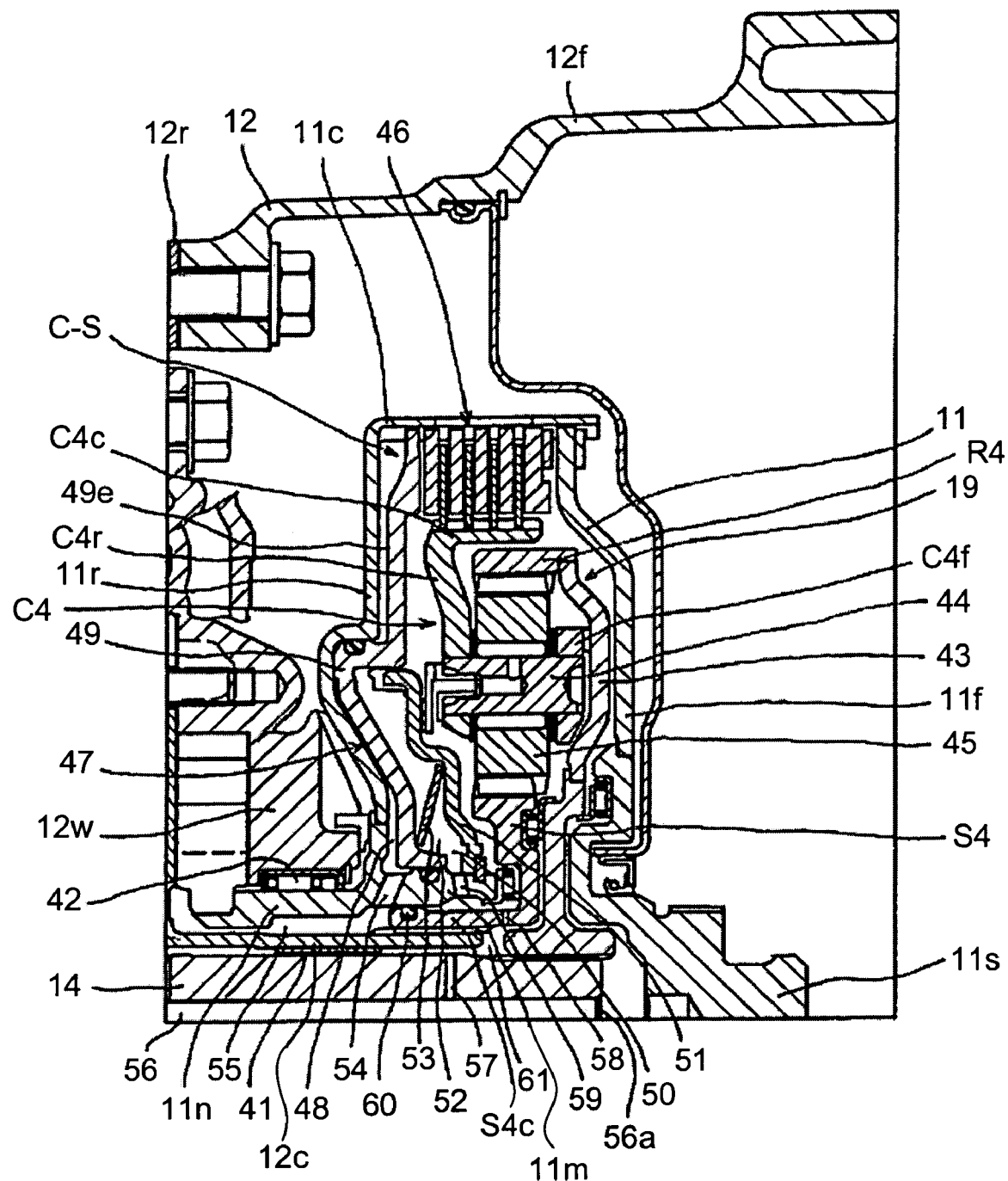
FIG. 5 is a cross-sectional drawing showing a detailed structure of speed-increasing planetary gear and start clutch portions of the automatic transmission according to the embodiment.

Next, the specific structures of the drive member 11, the speed-increasing planetary gear 19, and the start clutch C-S of the automatic transmission 10 for a diesel engine will be described based upon FIG. 5, wherein a major portion of the automatic transmission 10 is similar to that of an automatic transmission for a conventional gasoline engine. The automatic transmission 10 accommodates the start clutch C-S, in place of a torque converter, in a front case portion 12f of the transmission case 12 in order to connect the drive member 11 to which the output rotation of the diesel engine is transmitted, the speed-increasing planetary gear 19, and the ring gear R4 of the drive member 11 and the speed-increasing gear 19.

The transmission case 12 is structured with a cylindrical and bottomed rear case portion 12r; a front case portion 12f that is fixed to a front surface of the rear case portion 12r; and an intermediate wall portion 12w that is fixed to the front surface of the rear case portion 12r on an inner side of the front case portion 12f. Accommodated within the rear case portion 12r is a plurality of friction engagement elements for connecting or fixing the single planetary gear set 15, the multiple planetary gear set 16, and elements of the single planetary gear and the multiple planetary gear. Meanwhile, the front case portion 12f accommodates the drive member 11, the speed-increasing planetary gear 19, and the start clutch C-S.

On the intermediate wall portion 12w of the transmission case 12, a cylindrical support member 12c is provided protruding from the common axis 13, and the input shaft 14 is pivotally supported in a rotatable state in a center hole thereof by a metal bearing 41. A fitted front cylindrical portion 11m and a rear cylindrical portion 11n are provided on a rear wall 11r of the drive member 11 protruding in the longitudinal direction, and leave a clearance with the cylindrical support member 12c. Between the intermediate wall portion 12w and the speed-increasing planetary gear 19, the rear cylindrical portion 11n is rotatably supported on the common axis 13 in the center hole of the intermediate wall portion 12w by a needle bearing 42. A cylindrical fixed portion S4c formed on the sun gear S4 of the speed-increasing planetary gear 19 is fitted with an inner hole of the front cylindrical portion 11m with a sealing member 60 disposed therebetween, and is also in spline engagement with an outer periphery of the support member 12c of the intermediate wall portion 12w. On the input shaft 14, a connecting member 43 fixed to the ring gear R4 is in spline engagement with the front of the sun gear S4. A shaft portion 11s is provided protruding forward on a front wall 11f of the drive member 11, which is in abutment with a front surface of the connecting member 43 via a thrust bearing, and the shaft portion 11s is rotatably connected to a crankshaft of the diesel engine. The rear wall 11r and the front wall 11f of the drive member 11 are fixedly connected by a cylindrical portion 11c with a diameter larger than the speed-increasing planetary gear 19. Both ends of a pinion shaft 44 are respectively attached to a rear side wall C4r and a front side wall C4f of the carrier C4 of the speed-increasing planetary gear 19. In addition, a pinion 45, that meshes with the sun gear S4 and the ring gear R4, is rotatably supported by the pinion shaft 44.

Formed on the rear side wall C4r of the carrier C4 of the speed-increasing planetary gear 19 is a cylindrical engagement portion C4c that extends in the common axis 13 direction outward from the ring gear C4. In addition, a plurality of friction plates of the friction engagement portion 46 of the start clutch C-S are in alternate spline engagement with an inner peripheral surface of the cylindrical portion 11c of the drive member 11, as well as an outer peripheral surface of the engagement portion C4c. A circular cylinder 48 of a hydraulic servo portion 47 of the start clutch C-S is formed on an outer peripheral side of the front cylindrical portion 11m and on a surface side of the rear wall 11r of the drive member 11 opposite the speed-increasing planetary gear 19. A circular piston 49 is sealed and slidably fitted within the cylinder 48. Moreover, a flange portion 49e protrudes outward from a major diameter side of the circular piston 49 and opposes a rear end side of the friction engagement portion 46 of the start clutch C-S. An inner side of a circular plate 51 of a centrifugal hydraulic canceller 50 of the hydraulic servo portion 47 is fitted and clamped by a snap ring to a front end portion of the front cylindrical portion 11m. In addition, an outer diameter side of the circular plate 51 is slidably fitted in a fluid-tight state to an inner peripheral surface that is formed on an outer diameter side of the circular piston 49 and has a substantially identical diameter. Within a cancel oil chamber 52 formed between the circular piston 49 and the circular plate 51, a compression spring 53 is disposed for biasing the circular piston 49 in a direction such that the flange portion 49e separates from the friction engagement portion 46.

Additionally, a port 54 that opens to the circular cylinder 48 is provided in the front cylindrical portion 11m of the drive member 11. A hydraulic oil passage 55 for supplying and draining hydraulic oil via the port 54 of the circular cylinder 48 is formed on the intermediate wall portion 12w between the rear cylindrical portion 11n and the support member 12c. When the vehicle starts moving, once pressure-controlled hydraulic oil passes through the hydraulic oil passage 55 and the port 54 and is supplied to the circular cylinder 48, the circular piston 49 advances against the spring force of the compression spring 53. Hence, the friction plate of the friction engagement portion 46 is pressed such that the start clutch C-S is gradually engaged, and the drive member 11, rotatably connected to the crankshaft of the diesel engine, is connected to the carrier C4 of the speed-increasing planetary gear 19. Due to the engagement of the start clutch C-S, the rotation of the drive member 11, to which the output rotation of the diesel engine is transmitted, is accelerated by the speed-increasing planetary gear 19 and then transmitted to the input shaft 14. Communication of the hydraulic oil passage 55 to a reservoir leads to a decrease in pressure within the circular cylinder 48. Accordingly, the circular piston 49 recedes due to the spring force of the compression spring 53, which releases the friction plate of the friction engagement portion 46 to block the start clutch C-S. Hence, the output rotation of the diesel engine is no longer transmitted to the input shaft 14.

In addition, the sealing member 60 seals a space between the inner hole of the front cylindrical portion 11m of the drive member 11 and an outer periphery of the fixed portion S4c of the sun gear S4. The inner periphery of the fixed portion S4c and the outer periphery of the support member 12c of the intermediate wall portion 12w are also sealed to eliminate looseness in the spline engagement. In this manner, a seal is formed on an end (on the front side) of the hydraulic oil passage 55 to prevent the leakage of oil within the hydraulic oil passage 55 between the drive member 11 and the support member 12*c*.

A lubrication oil passage 56 is provided in the input shaft 14 on the axis as a lubrication oil passage. The lubrication oil passage 56 supplies lubrication oil to portions of the speed-increasing planetary gear 19 and the centrifugal hydraulic canceller 50 of the hydraulic servo portion 47. Additionally, the lubrication oil passage 56 opens to a front end surface of the input shaft 14 in front of the connecting member 43 to form an opening portion 56*a*. Also provided in the radial direction in the input shaft 14 is a branch hole 57 serving as a branch oil passage that communicates with the lubrication oil passage 56 rearward of the connecting member 43. The branch hole 57 also communicates with a communication oil passage 61 that is formed from a clearance between the outer periphery surface of the input shaft 14 and the inner periphery surface of the fixed portion S4*c* of the sun gear S4, and also formed from a communication hole 58 provided in the radial direction in the fixed portion S4*c*. More specifically, the lubrication oil passage 56 has the opening portion 56*a* that opens forward of the connecting member 43, and the branch oil hole 57 that communicates with the communication oil passage 61 rearward of the connecting member 43. In the front cylindrical portion 11*m*, a port 59 is provided in the radial direction to supply lubrication oil to the cancel oil chamber 52. The lubrication oil supplied by the lubrication oil passage 56 passes through the branch hole 57, the communication hole 58, and the port 59, to then flow inside the cancel oil chamber 52.

Lubrication oil from the lubrication oil passage 56 is supplied to the cancel oil chamber 52 via the communication oil passage 61 formed between the hydraulic oil passage 55 and the connecting member 43, which connects the input shaft 14 and the ring gear R4 that is a second rotation element. When the hydraulic servo portion 47 is rotated, centrifugal force generated from hydraulic oil in the circular cylinder 48 acting on the circular piston 49 is cancelled out by centrifugal force generated from the lubrication oil inside the cancel oil chamber 52 acting on the circular piston 49. Furthermore, the lubrication oil supplied to the lubrication oil passage 56 passes through the branch hole 57, the communication hole 58, and the opening portion 56*a* at the end of the input shaft 14, such that it is supplied to portions of the speed-increasing planetary gear 19 for lubrication.

The disclosure is made by reference to the exemplary embodiment. However, those skilled in the art would understand that obvious variants are included in the scope of the invention.

What is claimed is:

1. An automatic transmission, in which an input shaft and an output shaft are rotatably supported on a common axis, and a rotation of the input shaft is shifted to a plurality of speeds and transmitted to the output shaft by connecting and fixing a plurality of friction engagement elements, comprising:
    a transmission case rotatably supporting the input shaft and the output shaft;
    a drive member, to which an output rotation of an engine is transmitted, that is rotatably supported on the common axis on a front side of the transmission case; and
    a speed-increasing planetary gear that constantly accelerates and transmits the output rotation of the engine to the input shaft, and includes a first rotation element that is connectable with the drive member via a start clutch, a second rotation element that is directly connected to the input shaft, and a third rotation element that is fixed to a support member of the transmission case, wherein:
    a hydraulic servo portion of the start clutch is provided rearward of the speed-increasing planetary gear in the drive member,
    a cylinder of the hydraulic servo portion of the start clutch is formed by a back wall of the drive member,
    a hydraulic oil passage communicating with the cylinder of the hydraulic servo portion is provided between the drive member and the support member,
    a lubrication hole is provided in the input shaft for supplying lubrication oil to portions of the speed-increasing planetary gear and a centrifugal hydraulic pressure canceller of the hydraulic servo portion, and
    the drive member includes a front wall, a cylindrical portion and the back wall, with the front wall provided forward of the speed increasing planetary gear, the back wall provided rearward of the speed increasing planetary gear, and the front wall and the back wall connected by the cylindrical portion that has a diameter larger than the speed increasing planetary gear.

2. The automatic transmission according to claim 1, wherein the transmission case has a intermediate wall portion interposed between a rear case portion accommodating the plurality of friction engagement elements and a front case portion accommodating the speed-increasing planetary gear and the start clutch,
    the intermediate wall portion has the support member protruding toward the common axis direction and supporting the input shaft,
    the third rotation element is unrotatably connected to the support member extending from the intermediate wall portion, and
    the back wall of the drive member is rotatably supported by the intermediate wall portion between the intermediate wall portion and the speed-increasing planetary gear.

3. The automatic transmission according to claim 1, wherein an end of the hydraulic oil passage has a seal for preventing the leakage of oil from the hydraulic oil passage between the drive member and the support member.

4. The automatic transmission according to claim 3, wherein the start clutch is pressed by a piston operated by hydraulic pressure supplied from the hydraulic servo portion,
    a cancel oil chamber is formed on a side opposite the hydraulic servo portion of the piston for canceling out centrifugal hydraulic pressure acting on oil within the hydraulic servo portion, and
    lubrication oil from the lubrication oil passage is supplied to the cancel oil chamber via a communication oil passage formed between the hydraulic oil passage and a connecting member, which connects the input shaft and the second rotation element.

5. The automatic transmission according to claim 4, wherein the lubrication oil passage has an opening portion that opens forward of the connecting member, and a branch oil passage that communicates with the communication oil passage rearward of the connecting member.

6. The automatic transmission according to claim 1, wherein the start clutch is pressed by a piston operated by hydraulic pressure supplied from the hydraulic servo portion,
    a cancel oil chamber is formed on a side opposite the hydraulic servo portion of the piston for canceling out centrifugal hydraulic pressure acting on oil within the hydraulic servo portion, and lubrication oil from the lubrication oil passage is supplied to the cancel oil chamber via a communication oil passage formed between the hydraulic oil passage and a connecting member, which connects the input shaft and the second rotation element.

7. The automatic transmission according to claim 6, wherein the lubrication oil passage has an opening portion that opens forward of the connecting member, and a branch oil passage that communicates with the communication oil passage rearward of the connecting member.

8. The automatic transmission according to claim 2, wherein the speed-increasing planetary gear is comprised of a single pinion planetary gear, the first rotation element is a carrier, the second rotation element is a ring gear, and the third rotation element is a sun gear, a single planetary gear set connected to the input shaft and a multiple planetary gear set connected to the output shaft are provided between the input shaft and the output shaft, the single planetary gear set is comprised of a single pinion planetary gear provided with a first ring gear that is directly connected to the input shaft, a first sun gear that is fixed to the transmission case, and a first carrier that supports a pinion which meshes with the first ring gear and the first sun gear, and the multiple planetary gear set is comprised of a Ravigneaux type planetary gear structured with second and third sun gears, a long pinion that directly meshes with the second sun gear and meshes with the third sun gear via an intermediate pinion, a common carrier that supports the long pinion and the intermediate pinion, and a common ring gear that meshes with the long pinion, wherein the second sun gear is connectable with the first carrier via a third clutch and is fixable via a first brake, the common carrier is connectable with the input shaft via a second clutch and is fixable via a second brake, the common ring gear is directly connected to the output shaft, and the third sun gear is connectable with the first carrier via a first clutch.

9. The automatic transmission according to claim 1, wherein the speed-increasing planetary gear is comprised of a single pinion planetary gear, the first rotation element is a carrier, the second rotation element is a ring gear, and the third rotation element is a sun gear, a single planetary gear set connected to the input shaft and a multiple planetary gear set connected to the output shaft are provided between the input shaft and the output shaft, the single planetary gear set is comprised of a single pinion planetary gear provided with a first ring gear that is directly connected to the input shaft, a first sun gear that is fixed to the transmission case, and a first carrier that supports a pinion which meshes with the first ring gear and the first sun gear, and the multiple planetary gear set is comprised of a Ravigneaux type planetary gear structured with second and third sun gears, a long pinion that directly meshes with the second sun gear and meshes with the third sun gear via an intermediate pinion, a common carrier that supports the long pinion and the intermediate pinion, and a common ring gear that meshes with the long pinion, wherein the second sun gear is connectable with the first carrier via a third clutch and is fixable via a first brake, the common carrier is connectable with the input shaft via a second clutch and is fixable via a second brake, the common ring gear is directly connected to the output shaft, and the third sun gear is connectable with the first carrier via a first clutch.

* * * * *